United States Patent [19]
Green et al.

[11] Patent Number: 5,590,806
[45] Date of Patent: Jan. 7, 1997

[54] FUEL FILL PIPE SHELF FOR A GENERATOR SET FUEL TANK

[75] Inventors: Vincent D. Green, East Syracuse; Mark W. Colton, Clay, both of N.Y.

[73] Assignee: Carrier Corporation, Syracuse, N.Y.

[21] Appl. No.: 578,723

[22] Filed: Dec. 26, 1995

[51] Int. Cl.$^6$ ................................................. B65D 45/00
[52] U.S. Cl. ..................... 220/562; 220/565; 220/4.14; 220/4.12; 220/661; 220/86.2; 220/DIG. 24
[58] Field of Search ..................... 220/562, 566, 220/567, 4.12, 4.14, 4.15, 661, 86.2, DIG. 24, 86.1, 86.4

[56] References Cited

U.S. PATENT DOCUMENTS

| | | | |
|---|---|---|---|
| 1,782,271 | 11/1930 | Pennington | 220/562 |
| 2,189,945 | 2/1940 | Fitch | 220/562 |
| 5,097,976 | 3/1992 | Zink et al. | 220/562 |
| 5,361,906 | 11/1994 | Sterett | 220/562 |

*Primary Examiner*—Joseph M. Moy

[57] ABSTRACT

A fuel fill pipe shelf for a generator set fuel tank is mounted in the upper end of a tower of the fuel tank. The fuel pipe shelf comprises an insert which is welded into an opening in the upper end of the fuel tank. The insertcupies a volume which otherwise would be part of the interior of the fuel tank. The fuel fill, vent and fuel gage are all supported on the fuel shelf. As a result, the fuel fill, fuel gage and vent are all within a protected recess in the fuel tank.

7 Claims, 2 Drawing Sheets

FUEL FILL PIPE SHELF FOR A GENERATOR SET FUEL TANK

BACKGROUND OF THE INVENTION

The present invention relates to fuel tanks. More particularly, it relates to a fuel fill arrangement for a fuel tank which forms a part of a packaged engine driven electrical generator of the type used in connection with refrigerated containers in transport applications.

An increasingly popular way of transporting goods makes use of removable cargo carrying containers, commonly referred to as "intermodal" containers, which are adapted for transport over both land and water. Such containers are designed for transport by truck or rail to a freight terminal or ship loading dock, where they may be transferred to a ship for overseas delivery.

Many of such containers are provided with refrigeration units which allow them to transport perishable goods therein. The refrigeration units attached to such containers include an electric motor for driving a refrigerant compressor forming a part of the unit. As a result, they require a source of electrical power for operation. When located at a freight terminal, a refrigerated container is provided with electrical power through a connection to a conventional source of electrical power. When located on a ship, a refrigerated container receives electrical power from the ship's electrical system. When being transported by road, rail or when no other power source is available, a self contained temporary power source which includes a motor generator set, may be mounted directly to the refrigerated container.

Since a generator set is a self-contained source of auxiliary power, it is necessary that an integral part thereof be a fuel tank for the motor, which is typically a diesel engine. Many generator sets are required to have the capability to provide uninterrupted service for an extended length of time. For example, for transcontinental rail shipping, it is desirable to have a generator set which is capable of operating for more than 130 hours without the requiring refueling. Such extended use capabilities also will increase the reliability of the system and decrease operating costs. Accordingly, it is desirable to provide a high capacity integral fuel tank for such a generator set.

It should be appreciated that space is extremely limited in the design of such generator sets. Such space limitations are a result of the environment in which they are used wherein there are limitations on components extending beyond a prescribed envelope universally defined by the width of the containers on which they are used. Also, because the units are quite often mounted on containers being towed by tractor trailers, size limitations are dictated by the necessity of providing adequate clearance between the unit and the tractor unit. Further space limitations are dictated by the requirement that the generator set not extend vertically above the top of the container on which it is mounted nor should it extend downward such that it would interfere with the condenser discharge and the operating controls of the refrigeration unit.

One approach to achieving a high capacity fuel tank is to provide a substantially U-shaped fuel tank having a lower section, which underlies and supports the motor generator and other components of the generator set and which comprises towers which extend upwardly on both sides of the generator set. It is desirable for these towers to be as high as possible, within the confines of the unit, to maximize fuel capacity.

It is also necessary for each of the towers to be provided with an appropriate fuel fill, vent and fuel gage. This is necessary because it is a further requirement that generator sets of this type be capable of being fueled from either side of the unit. It is also desirable that each of the fill pipes in the generator set be within the external profile of the generator set in order to provide protection from damage. A further desired feature in such a design is for the fuel gage to be readily visible when the fuel tank is being filled.

SUMMARY OF THE INVENTION

According to the present invention, a fill pipe assembly is provided for a liquid storage tank. The tank comprises an upper end including a top and at least one lateral surface.

An opening is provided in the top and the lateral surface which together cooperate to define a cut out at the upper end of the tank. A fill pipe assembly comprising an insert is adapted to be matingly received in the cut out and into the confines of what would have been the interior volume of the tank before the cut out was made. The insert is attached to the opening in fluid tight relationship. A fill opening is provided within the insert.

BRIEF DESCRIPTION OF THE DRAWINGS

This invention may be better understood and its objects and advantages will become apparent to those skilled in the art by reference to the accompanying drawings, in which.

DESCRIPTION OF THE PREFERRED EMBODIMENT

Figure 1:
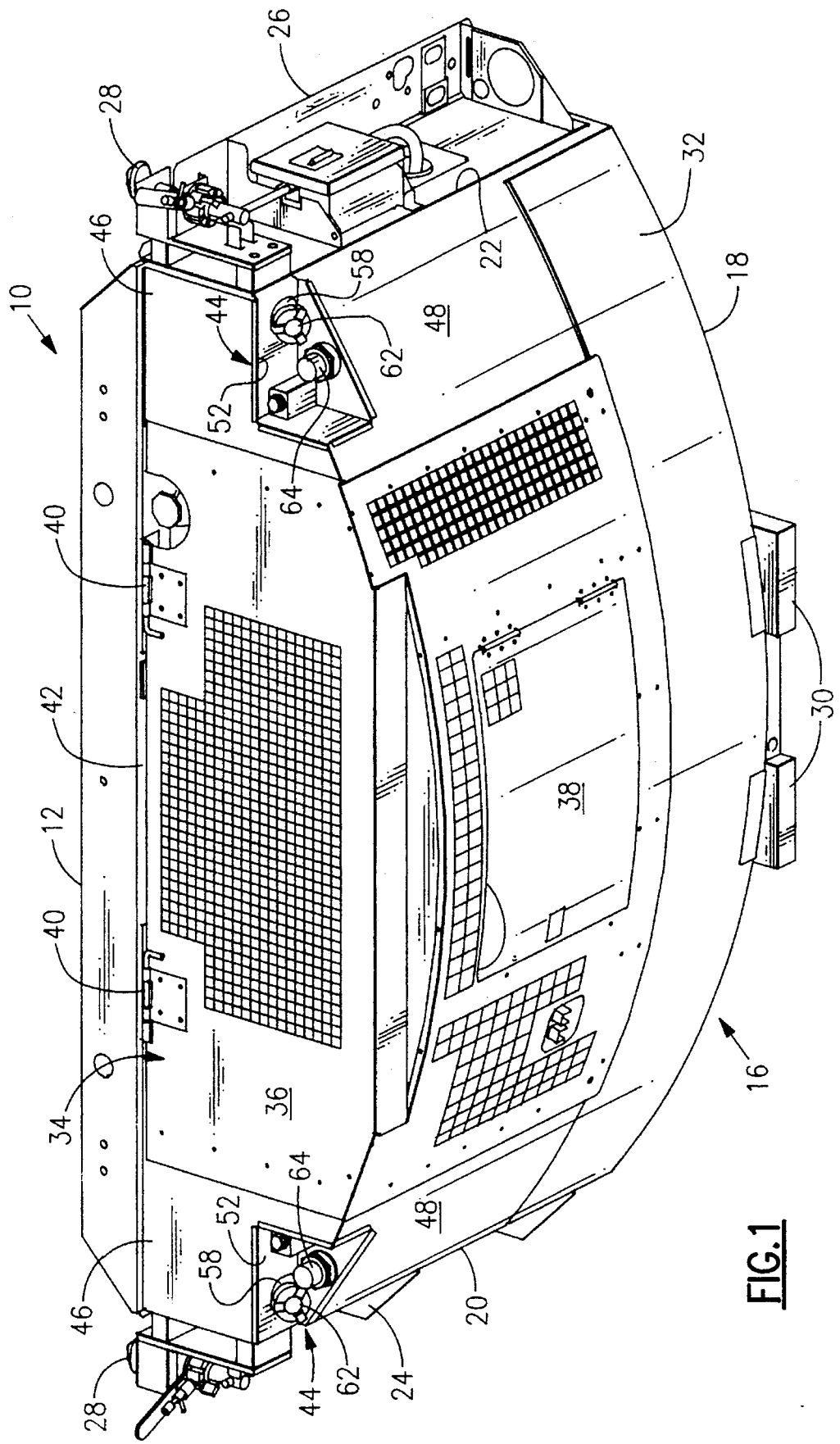
FIG. 1 is a perspective view of a generator set having fuel fill shelves according to the present invention.

FIG. 1 illustrates a diesel driven generator set 10, which is adapted for mounting on the end of a refrigerated container in order to provide electric power to a refrigeration unit, which is also mounted on the container.

The structural frame of the generator set, comprises a number of structural elements, including an angle iron 12, which extends across substantially the entire back of the generator set. The angle iron 12, in turn, is structurally attached to an integrally formed fuel tank generally designated by the reference numeral 16. The fuel tank 16 is generally U-shaped and includes a lower portion 18, which defines substantially the entire lower portion of the generator set, and two tower sections 20 and 22 at the left and right hand sides of the generator set, respectively.

Attached to the outboard side of the towers 20 and 22 are vertically extending structural elements 24 and 26, respectively. Attached to the upper end of each of the vertical elements 24 and 26 is a clamping device 28 adapted to attach the generator set to the corner post of a container refrigeration unit in a conventional fashion.

Underlying and structurally attached to the lower portion 18 of the fuel tank are a pair of forklift pockets 30, which are spaced to receive the forks of a conventional forklift for facilitating handling of the units. It will be noted that the forklift pockets extend beyond a from arcuate surface 32, which defines the front of the lower tank 18.

The operational components of the generator set 10 are all mounted within the confines of the generator set defined by the lower fuel tank 18 and the left and right hand towers 20 and 22. This region of the generator set is enclosed by the cover 34.

With reference to the various drawing figures, the cover is made from sheet metal and comprises a substantially planar top section 36 and an arcuately shaped section 38. The cover is provided with a pair of hinges 40 at the back edge 42 of the top 36 which facilitate pivotal movement of the cover upwardly and rearwardly to facilitate access to the interior components of the generator set. Suitable conventional mechanical means such as threaded bolts or the like are provided to retain the cover in its closed position during normal operation. The hinges may be eliminated and threaded bolts used for secure attachment of the cover.

Each of the left hand and the right hand fuel tank towers 20 and 22, respectively, are provided with a fuel fill shelf generally designated by reference numeral 44. The fuel fill shelves are identical with the exception that they are mirror images of one another and, accordingly, the description will not distinguish between left and right hand sides. It will be noted that the top 36 of the cover 34 is co-planar with a top section 46 of each of the fuel towers 20 and 22, respectively. Likewise, the front facing surface 48 of each of the fuel towers 20, 22 are arcuately shaped and blend in with the front surface defined by the front 38 of the cover 34. Accordingly, these surfaces of the fuel tank cooperate with the cover 34 to define the outer profile of the generator set 10.

Figure 2:
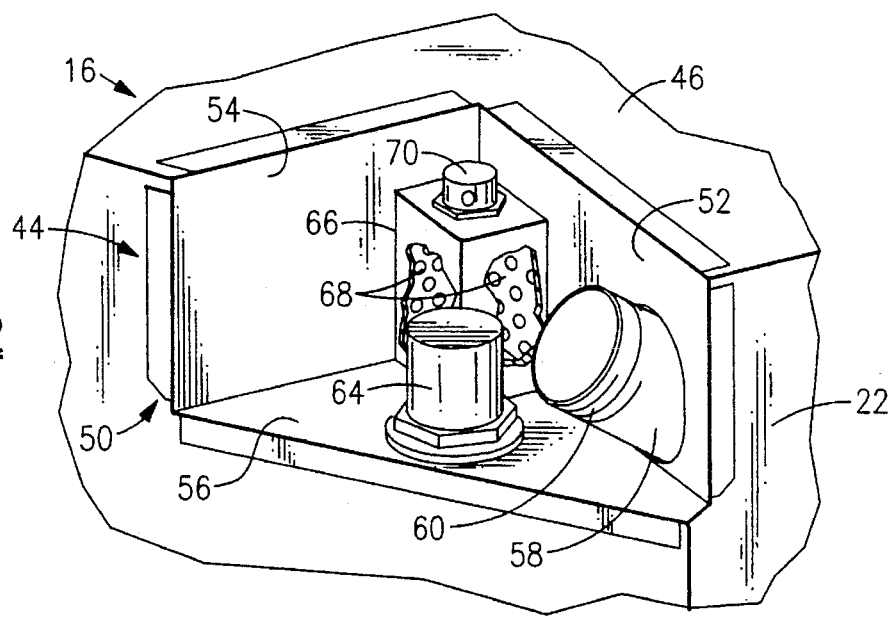
FIG. 2 is an enlarged fragmented view of the fuel fill shelf for the right hand fuel tank tower of the generator set of FIG. 1.
Figure 3:
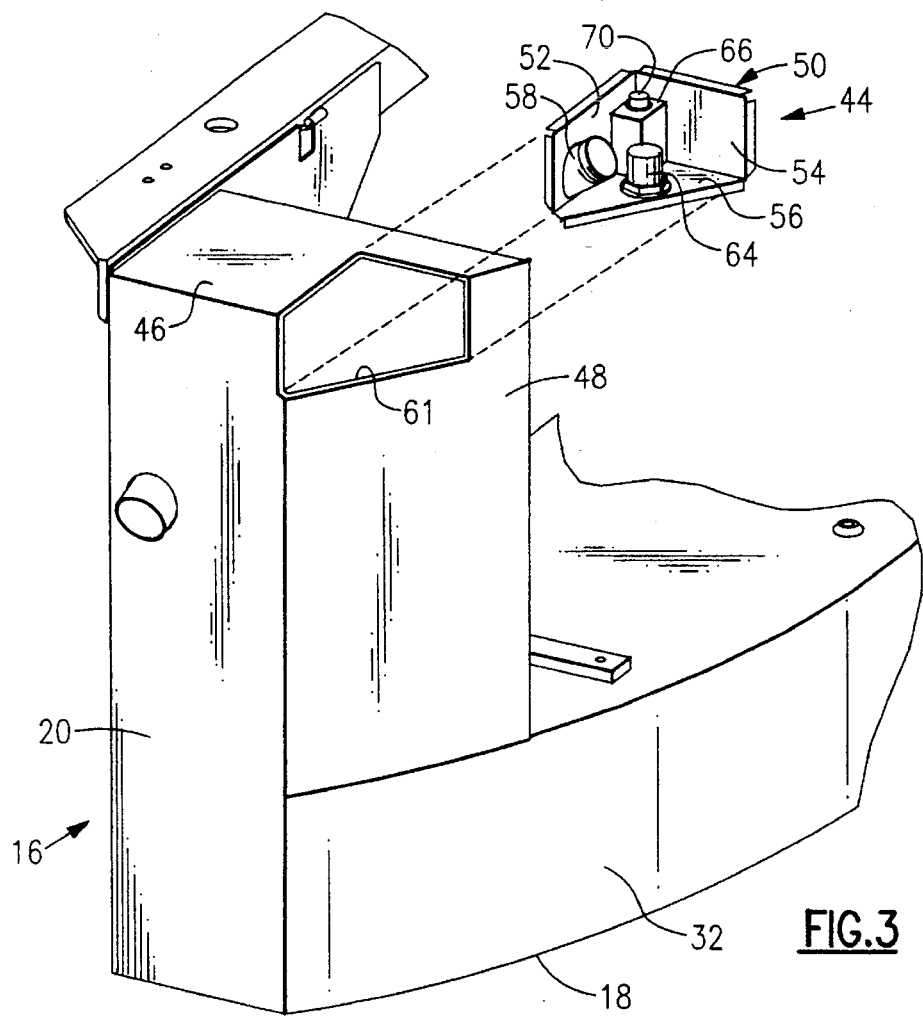
FIG. 3 is a perspective fragmented view of the left hand fuel tank tower of the generator set of FIG. 1 with the fuel shelf removed therefrom.

Looking now at FIGS. 2 and 3, the fuel fill shelf 44 comprises a three sided steel insert 50 defined by a first rectangular section 52 and a second shorter rectangular section 54 intersecting with the first at a right angle. A triangular planar section 56 interconnects the lower edges of the rectangular sections 52 and 54. Each of the outer edges of the three sided insert 50 are provided with tab-like extensions, all designated by reference numeral 59. The extensions 59 facilitate welding of the unit into a mating cut-out 61 in the upper outside corner of each of the fuel towers 20, 22 adapted to receive the three sided unit 50.

The rectangular section 52 is provided with a fuel fill pipe 58 welded into a suitable opening therein at an angle adapted to receive a conventional fuel fill nozzle. The length and the angle of the fill pipe are such that the tank may be filled to its maximum designated capacity while still leaving a desired five percent (5%) volumetric air capacity within the tank. The fuel fill 58 is threaded at its outer end 60 so as to receive a conventional threaded fill cap 62, as shown in FIG. 1.

The triangular section 56 is provided with a suitable threaded opening therein adapted to receive a fuel gage assembly 64 therein. Welded into the inside corner of the three sided insert 50 is a three sided vent box 66. The vent box 66 is welded to each of the rectangular sections 52 and 54 and the triangular section 56. As noted from the breakaway shown in FIG. 2, the walls of the rectangular sections 52 and 54, which are enclosed by the vent box 66, are provided with a plurality of openings 68 therein which communicate the interior of the fuel tank with the interior of the vent box. A conventional fuel tank vent device 70 is mounted in the top end of the vent box 66. The vent allows passage of air and fumes from the interior of the tank outwardly and as is conventional for such vents, and is provided with a spring loaded device which prevents the leakage of fuel therefrom in the event the unit is tipped over.

As mentioned above, the fuel fill shelf is adapted to be prefabricated, as illustrated in FIG. 3, and then placed into position in the cut out 61 provided in the top of the fuel tower where it is supported in position by the tabs 58 prior to being permanently welded it into position as illustrated in FIG. 1.

Accordingly, it will be appreciated that the fuel fill shelf 44 provides a location for the fuel fill pipes wherein the fuel fill is within the outer profile of the generator set 10 as discussed above. Further, the fuel fill shelf 44 provides a level surface for installation of the fuel gage 64 and the vent 70. As a result, each of these components is located where it is readily accessible and is also protected from potential damage by virtue of its location within the outer confines of the generator set.

What is claimed is:

1. The combination of a fuel storage tank and a fill pipe assembly for the storage tank:

said tank comprising an upper end including a top and at least one lateral surface, said tank having an opening in the top thereof and an opening in said lateral surface thereof which cooperate with one another to define a cut out at the upper end of said tank;

said fill pipe assembly comprising: an insert adapted to be matingly received in said cut out, substantially within the confines of what would have been the interior of said tank before said cut out was made, said insert being further adapted to be attached to said openings in said top and lateral surface of said tank in fluid tight relationship;

said insert having a fuel fill opening therein.

2. The apparatus of claim 1 further including a fill pipe adapted to be attached to said fuel fill opening in fluid tight relationship at one end thereof and having the other end thereof adapted to receive a fuel fill nozzle; the other end thereof still being within said confines of said storage tank.

3. The apparatus of claim 2 wherein said insert comprises a substantially triangular horizontal section, and first and second rectangular sections attached to adjacent sides of said triangular section at right angles thereof, said rectangular sections also being attached to one another at the corner of said triangular section where said two adjacent sides intersect.

4. The apparatus of claim 3 wherein each of said free edges of said triangular section and said two rectangular sections are provided with weld tabs thereon, and wherein said insert and said fuel tank are made from a weldable material, whereby said insert is received in said cut out at the upper end of said tank and is welded thereto with the assistance of said weld tabs.

5. The apparatus of claim 4 further including a fuel gage mounted within said horizontal triangular section.

6. The apparatus of claim 5 further including a vent attached to said insert.

7. The apparatus of claim 6 wherein said veto comprises an enclosed vent box attached to said insert in fluid tight relationship and at least one opening in said insert communicating the interior of said fuel tank with the interior of said vent box; and vent means mounted at the upper end of said vent box.

\* \* \* \* \*